US010367958B2

(12) United States Patent
Amano

(10) Patent No.: US 10,367,958 B2
(45) Date of Patent: Jul. 30, 2019

(54) DISPLAY CONTROL DEVICE, METHOD, AND NON-TRANSITORY COMPUTER READABLE MEDIUM FOR RECOMMENDING THAT A USER USE A SIMPLE SCREEN RATHER THAN A NORMAL SCREEN

(71) Applicant: FUJI XEROX CO., LTD., Tokyo (JP)

(72) Inventor: Koji Amano, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 707 days.

(21) Appl. No.: 14/989,855

(22) Filed: Jan. 7, 2016

(65) Prior Publication Data
US 2016/0117178 A1    Apr. 28, 2016

Related U.S. Application Data

(63) Continuation of application No. 13/849,920, filed on Mar. 25, 2013, now abandoned.

(30) Foreign Application Priority Data

Jul. 10, 2012    (JP) .................................. 2012-154790

(51) Int. Cl.
*H04N 1/00* (2006.01)
*G06F 11/34* (2006.01)
(Continued)

(52) U.S. Cl.
CPC ....... *H04N 1/00514* (2013.01); *G06F 3/0481* (2013.01); *G06F 3/0482* (2013.01);
(Continued)

(58) Field of Classification Search
CPC .......... H04N 1/00413; H04N 1/00482; H04N 1/00501; H04N 1/00503; H04N 1/00506;
(Continued)

(56) References Cited

U.S. PATENT DOCUMENTS 5,115,501 A * 5/1992 Kerr ........................ G06F 9/453
5,420,975 A * 5/1995 Blades ................. G06F 3/0482
715/811
(Continued)

FOREIGN PATENT DOCUMENTS

JP    2003051903    *    2/2003
JP    2007-25460 A    2/2007
(Continued)

OTHER PUBLICATIONS

Machine Translation of Shinichi et al. (JP 2007/0254460), Created by Examiner from J-PlatPat, Aug. 2018 (Year: 2018).*
(Continued)

*Primary Examiner* — Nicholas Ulrich
(74) *Attorney, Agent, or Firm* — Sughrue Mion, PLLC

(57)    ABSTRACT

A display control device and method configured to recommend, at proper times, that a user use a simple screen rather than a normal screen and increase effective utilization of the simple screen. A normal screen and a simple screen may be displayed for accepting a setting operation. A recommendation may be displayed that a user use the simple screen at proper times, including but not limited to, if every function set by the user on the normal screen is settable on the simple screen, if a setting period exceeds a certain value, if a ratio of functions settable on the simple screen to set functions that is calculated from the operation history regarding the plurality of setting operations is greater than or equal to a predetermined value, if a predetermined number of functions on the normal screen match functions in the operation history information, or by using operation history, acquired information about the set function, a set value, or a setting period.

10 Claims, 13 Drawing Sheets

(51) Int. Cl.
*G06F 9/451* (2018.01)
*G06F 3/0481* (2013.01)
*G06F 3/0482* (2013.01)
*G06F 3/0489* (2013.01)
*H04N 1/44* (2006.01)
*G06F 3/0488* (2013.01)

(52) U.S. Cl.
CPC .......... *G06F 3/04895* (2013.01); *G06F 9/453* (2018.02); *G06F 11/34* (2013.01); *G06F 11/3438* (2013.01); *H04N 1/00408* (2013.01); *H04N 1/00411* (2013.01); *H04N 1/00416* (2013.01); *H04N 1/00474* (2013.01); *H04N 1/00482* (2013.01); *H04N 1/00503* (2013.01); *G06F 3/0488* (2013.01); *G06F 3/0489* (2013.01); *G06F 9/451* (2018.02); *H04N 1/00472* (2013.01); *H04N 1/4413* (2013.01); *H04N 2201/0093* (2013.01); *H04N 2201/0094* (2013.01)

(58) Field of Classification Search
CPC .......... H04N 1/00514; H04N 1/00517; H04N 1/00437; H04N 1/00395; G06F 3/0482; G06F 9/451; G06F 9/453; G06F 3/048; G06F 3/04842; G06F 11/34; G06F 11/3438
See application file for complete search history.

(56) References Cited

U.S. PATENT DOCUMENTS

| | | | | |
|---|---|---|---|---|
| 5,535,321 A * | 7/1996 | Massaro | ................ | G06F 19/00 715/707 |
| 7,171,243 B2 * | 1/2007 | Watanabe | ............ | G06F 3/0482 379/88.04 |
| 7,620,894 B1 * | 11/2009 | Kahn | .................... | G06F 3/0481 715/707 |
| 8,584,040 B2 * | 11/2013 | Saito | .................... | G06F 3/0482 715/810 |
| 2001/0026291 A1 * | 10/2001 | Uchida | ............... | G01C 21/3611 715/810 |
| 2002/0047815 A1 * | 4/2002 | Maeda | ............... | H04N 1/00416 345/1.1 |
| 2002/0075320 A1 * | 6/2002 | Kurapati | ................ | H04N 7/165 715/811 |
| 2004/0100505 A1 * | 5/2004 | Cazier | ................... | G06F 3/0482 715/811 |
| 2005/0054381 A1 * | 3/2005 | Lee | ......................... | G06F 3/011 455/557 |
| 2008/0046507 A1 * | 2/2008 | Westphal | ............ | G06F 17/3089 709/203 |
| 2008/0092082 A1 | 4/2008 | Saito et al. | | |
| 2009/0040357 A1 * | 2/2009 | Ichii | ................... | H04N 5/23245 348/333.02 |
| 2009/0044151 A1 * | 2/2009 | Ichii | ...................... | G06F 3/0482 715/854 |
| 2009/0318187 A1 * | 12/2009 | Tetsuhashi | ............ | G06F 3/0482 455/556.1 |
| 2009/0319462 A1 * | 12/2009 | Tirpak | .................... | G06F 9/451 706/47 |
| 2010/0088599 A1 | 4/2010 | Morimoto | | |
| 2010/0290068 A1 | 11/2010 | Okada et al. | | |
| 2011/0128575 A1 * | 6/2011 | Iwata | ................. | H04N 1/00416 358/1.15 |
| 2011/0131506 A1 * | 6/2011 | Calissendorff | ........ | G06F 3/0482 715/747 |
| 2011/0209077 A1 * | 8/2011 | Matsuura | ........... | H04N 1/00416 715/765 |
| 2012/0092692 A1 | 4/2012 | Yoshida et al. | | |

FOREIGN PATENT DOCUMENTS

| | | |
|---|---|---|
| JP | 2007-181993 A | 7/2007 |
| JP | 2008-097468 A | 4/2008 |

OTHER PUBLICATIONS

Communication dated Jan. 31, 2018 from the State Intellectual Property Office of the P.R.C. in counterpart Chinese application No. 201310169339.X.

Communication dated May 18, 2017, issued from the State Intellectual Property Office of People's Republic of China in counterpart Application No. 201310169339.X.

Communication dated Feb. 23, 2016 from the Japanese Patent Office issued in corresponding Application No. 2012-154790.

Communication dated Aug. 14, 2018 from the State Intellectual Property Office of the P.R.C. in counterpart Chinese application No. 201310169339.X.

* cited by examiner

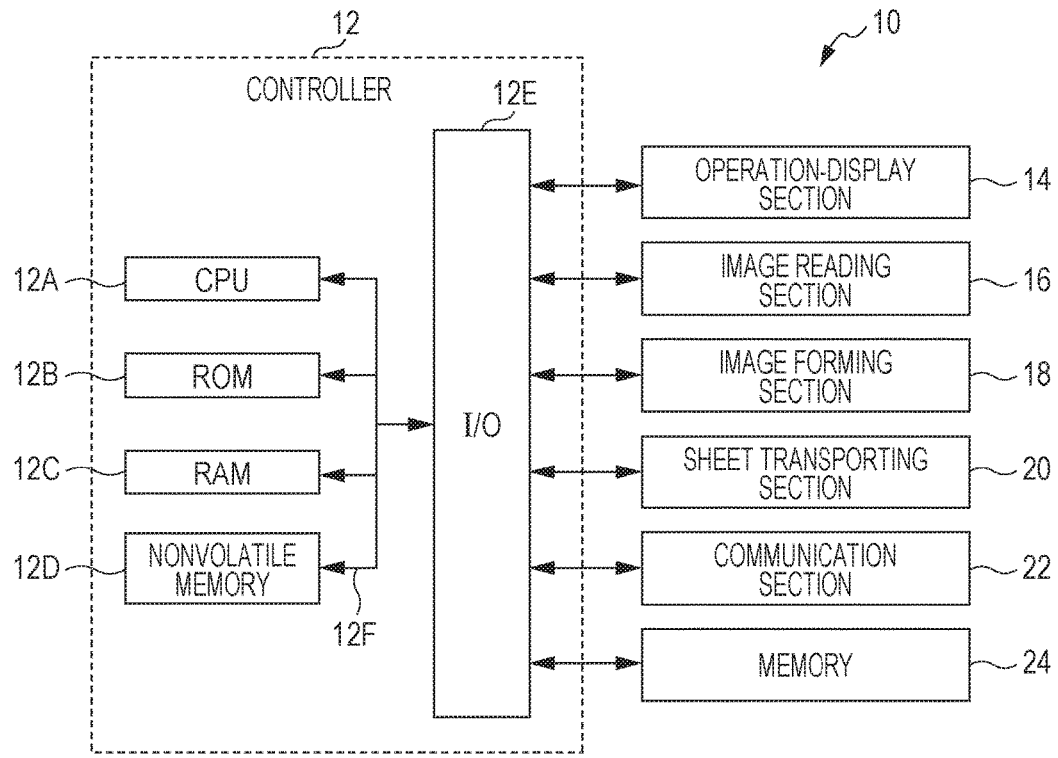
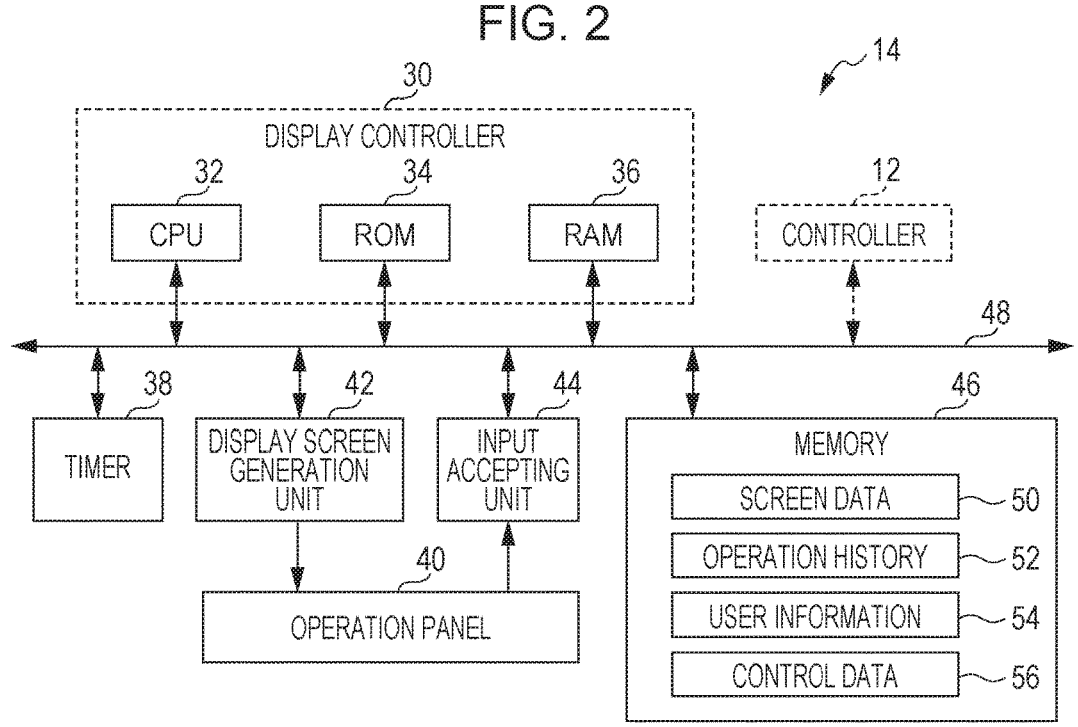

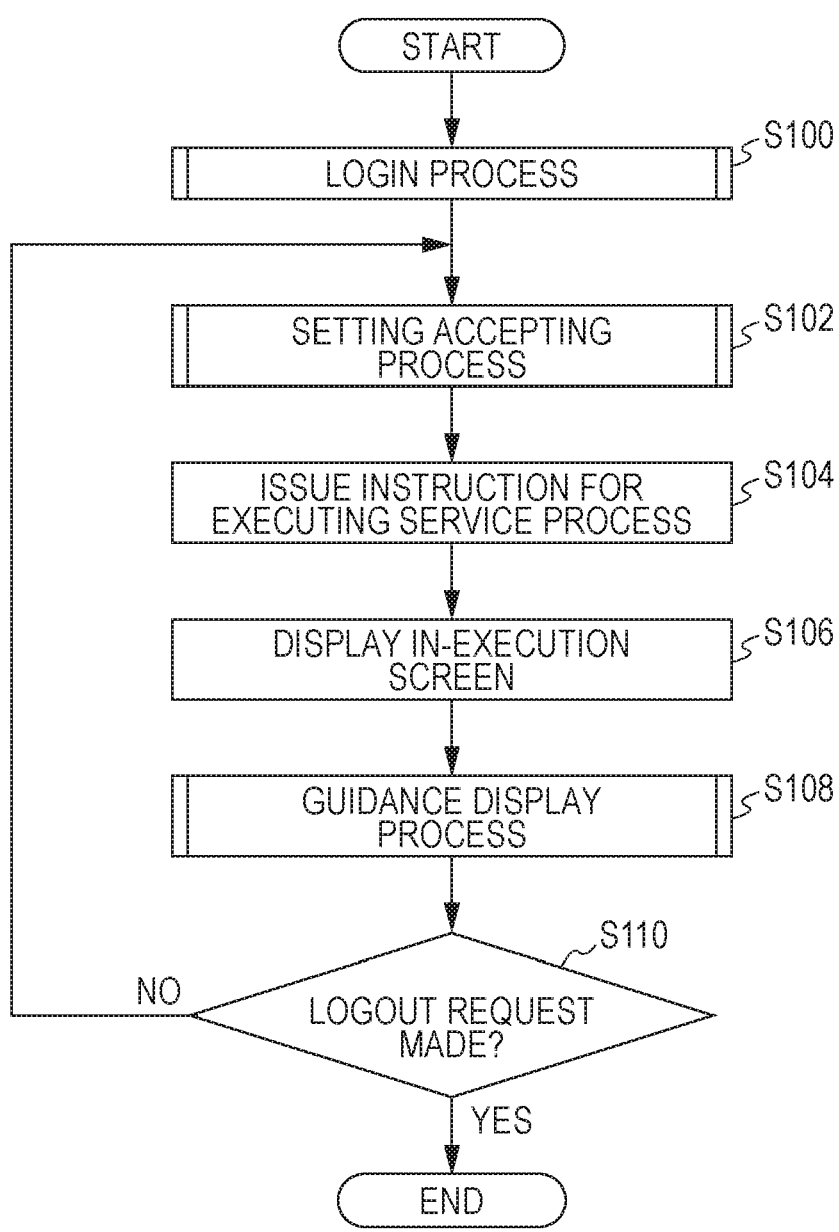

FIG. 8

| USER | OPERATION HISTORY ||||||
|---|---|---|---|---|---|---|
| | OPERATION DATE AND TIME | SELECTED SERVICE | SET FUNCTIONS | SET VALUES | SETTING PERIOD | OPERATION PERIOD |
| ABC | 01/04/2012 | NORMAL COPY | 2-SIDED/1-SIDED, MAGNIFICATION SELECTION, COLOR MODE | 1 TO 2, 100%, FULL COLOR | 30 SEC, 15 SEC, 45 SEC | 100 SEC |
| | 07/15/2012 | NORMAL COPY | 2-SIDED/1-SIDED, COLOR MODE | 2 TO 1, FULL COLOR | 10 SEC, 50 SEC | 70 SEC |
| | 12/28/2012 | SIMPLE COPY | 2-SIDED/1-SIDED, COLOR MODE | 1 TO 2, AUTO | 3 SEC, 1 SEC | 6 SEC |
| ... | ... | ... | ... | ... | ... | ... |
| XYZ | 04/01/2012 | NORMAL COPY | 2-SIDED/1-SIDED, N-UP | 2 TO 1, 4-UP | 3 SEC, 4 SEC | 10 SEC |
| | 07/15/2012 | NORMAL COPY | COLOR MODE | B/W | 2 SEC | 5 SEC |

DISPLAY CONTROL DEVICE, METHOD, AND NON-TRANSITORY COMPUTER READABLE MEDIUM FOR RECOMMENDING THAT A USER USE A SIMPLE SCREEN RATHER THAN A NORMAL SCREEN

CROSS-REFERENCE TO RELATED APPLICATIONS

This application is a continuation of U.S. application Ser. No. 13/849,920 filed on Mar. 25, 2013 and is based on and claims priority under 35 USC 119 from Japanese Patent Application No. 2012-154790 filed Jul. 10, 2012. The disclosures of which are incorporated herein by reference.

BACKGROUND

Technical Field

The present invention relates to a display control device, a service providing apparatus, a display control method, and a non-transitory computer readable medium.

SUMMARY

According to an aspect of the invention, there is provided a display control device including a first memory, an operation-display unit, and a display controller. The first memory stores data of a normal screen and data of a simple screen. The normal screen is a screen that displays functions related to a service process provided to a user, whereas the simple screen is a screen that displays a smaller number of functions than the normal screen. The operation-display unit displays one of the normal screen and the simple screen to the user and accepts a setting operation performed by the user on a function among the displayed functions. The display controller controls the operation-display unit so that an indication recommending the user to use the simple screen is displayed in a case where every function set by the user on the normal screen is settable on the simple screen.

BRIEF DESCRIPTION OF THE DRAWINGS

Exemplary embodiments of the present invention will be described in detail based on the following figures, wherein:

FIG. 1 is a block diagram illustrating an example of a configuration of a service providing apparatus according to a first exemplary embodiment of the present invention;

FIG. 2 is a block diagram illustrating an example of a configuration of an operation-display section according to the first exemplary embodiment of the present invention;

FIG. 7 is a flowchart illustrating a procedure of a display control process according to the first exemplary embodiment of the present invention;

FIG. 8 is a schematic diagram illustrating an example of a table that stores an operation history;

DETAILED DESCRIPTION

Figure 3:
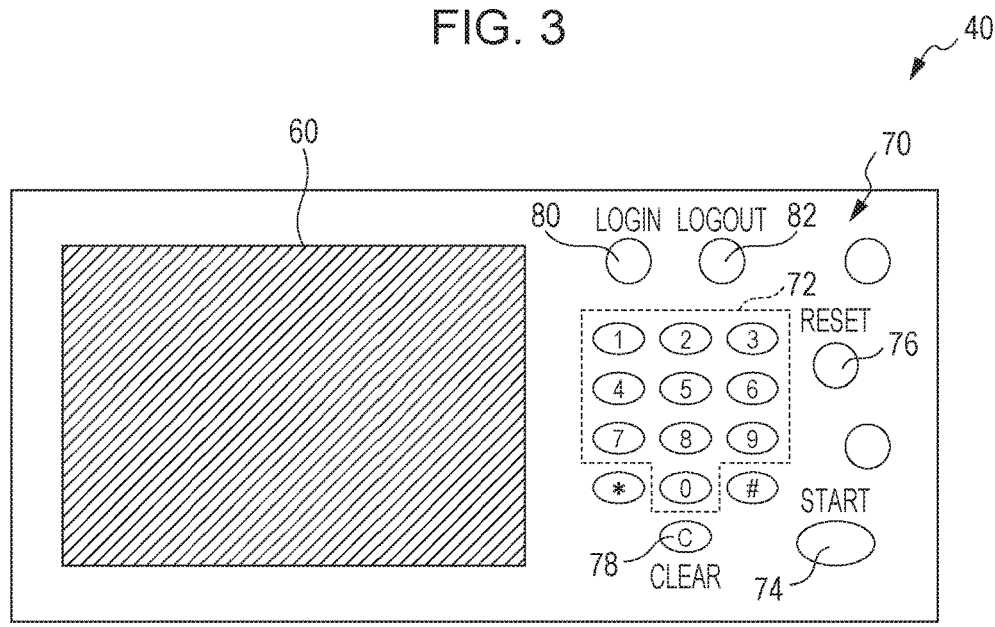
FIG. 3 is a plan view illustrating an example of a configuration of an operation panel.

Exemplary embodiments of the present invention will be described in detail below with reference to the accompanying drawings.

First Exemplary Embodiment
Service Providing Apparatus

A service providing apparatus according to a first exemplary embodiment of the present invention will be described. The service providing apparatus may be a multifunction printer that provides multiple service processes. The service providing apparatus according to this exemplary embodiment provides multiple service processes, which include at least a copy process, a print process, an image reading process, and a facsimile process. Hereinafter, the copy process, the print process, the image reading process, and the facsimile process may be referred to as "copying", "printing", "scanning", and "fax", respectively. Also, the service processes may be simply referred to as "services", such as a normal copy process being referred to as "normal copy".

Overall Configuration of Service Providing Apparatus

FIG. 1 is a block diagram illustrating an example of a configuration of the service providing apparatus according to the first exemplary embodiment of the present invention. As illustrated in FIG. 1, a service providing apparatus 10 includes a controller 12, an operation-display section 14, an image reading section 16, an image forming section 18, a sheet transporting section 20, a communication section 22, and a memory 24. This configuration of the service providing apparatus 10 is merely an example, and thus the configuration and arrangement of the individual sections may be changed, such as an unnecessary functional section being removed or a new functional section being added.

the controller 12 is implemented as a computer that controls the service providing apparatus 10 and performs various computations. Specifically, the controller 12 includes a central processing unit (CPU) 12A, a read only memory (ROM) 12B that stores various programs, a random access memory (RAM) 12C that is used as a work area during execution of a program, a nonvolatile memory 12D that stores various pieces of information, and an input/output interface (I/O) 12E. The CPU 12A, the ROM 12B, the RAM 12C, the nonvolatile memory 12D, and the I/O 12E are connected to each other via a bus 12F.

Each of the operation-display section 14, the image reading section 16, the image forming section 18, the sheet transporting section 20, the communication section 22, and the memory 24 is connected to the I/O 12E of the controller 12. The controller 12 exchanges information with each of the operation-display section 14, the image reading section 16, the image forming section 18, the sheet transporting section 20, the communication section 22, and the memory 24 so as to control the section.

the operation-display section 14 includes various buttons and an operation panel that displays various screens. With these components, the operation-display section 14 accepts operations performed by the user and displays various pieces of information to the user. Details about the configuration of the operation-display section 14 will be described later.

The image reading section 16 includes an image reading device, such as an image sensor, that optically reads an image formed on a sheet; and a scanning mechanism that performs a scan on a sheet. With these components, the image reading section 16 reads an image formed on an original document placed at the image reading section 16 and generates image information.

The image forming section 18 is a device that forms an image on a sheet. For example, the image forming section 18 that uses the electrophotographic system to form an image includes an image forming unit and a fixing device. The image forming unit includes a photoconductor drum, a charging device, an exposure device, a developing device, a transfer device, and a cleaning device.

Now, an image forming operation based on the electrophotography will be briefly described. The photoconductor drum is charged by the charging device. The exposure device exposes the charged photoconductor drum to light that is modulated in accordance with image data, thereby forming an electrostatic latent image corresponding to the image data on the photoconductor drum. The developing device develops, by using toners, the electrostatic latent image formed on the photoconductor drum. The transfer device transfers the resultant toner image formed on the photoconductor drum onto a sheet. The fixing device fixes the transferred toner image on the sheet.

The sheet transporting section 20 includes a sheet container that holds sheets therein, pickup rollers that pick up a sheet from the sheet container, and transporting rollers that transport a sheet that has been picked up. With these components, the sheet transporting section 20 transports a sheet picked up from the sheet container to the image forming section 18. The sheet transporting section 20 also transports a sheet on which an image has been formed by the image forming section 18 to a sheet output tray.

The communication section 22 is an interface that communicates with an external apparatus via a wired or wireless communication network. For example, the communication section 22 functions as an interface that communicates with an external apparatus, such as a computer, that is connected to a network, such as a local area network (LAN) or the Internet. For example, the communication section 22 communicates with an external apparatus, such as a computer, so as to acquire image information, image formation information used in image formation, or the like from the external apparatus. The communication section 22 may also acquire various programs, such as application programs, from an external apparatus.

The memory 24 includes a storage device, such as a hard disk drive. The memory 24 stores various programs and various kinds of data, such as log data.

Various drives may be connected to the controller 12. The drives are devices that read data from a computer readable portable recording media, such as a flexible disk, a magneto-optical disk, a compact disc-read only memory (CD-ROM), and a universal serial bus (USB) memory, and that write data on the computer readable portable recording media. When the various drives are connected, the controller 12 may load a program recorded on a portable recording medium by using the corresponding drive and may execute the program.

Configuration of Operation-Display Section

Now, a configuration of the operation-display section 14 will be described.

FIG. 2 is a block diagram illustrating an example of a configuration of the operation-display section 14 according to this exemplary embodiment of the present invention. As illustrated in FIG. 2, the operation-display section 14 includes a display controller 30, a timer 38, an operation panel 40, a display screen generation unit 42, an input accepting unit 44, and a memory 46. As described with reference to FIG. 1, the operation-display section 14 is connected to the controller 12 of the service providing apparatus 10 via the I/O 12E. The configuration of the operation-display section 14 is merely an example, and thus the configuration and arrangement of the individual components may be changed, such as an unnecessary functional unit being removed or a new functional unit being added.

The display controller 30 is implemented as a computer that controls the operation-display section 14 and performs various computations. Specifically, the display controller 30 includes a CPU 32, a ROM 34, and a RAM 36. In this exemplary embodiment, the ROM 34 stores a control program used when a "display control process" described below or the like is executed. The CPU 32 reads a stored program from the ROM 34 and executes the program by using the RAM 36 as a work area.

Each of the CPU 32, the ROM 34, and the RAM 36 of the display controller 30 is connected to the timer 38, the display screen generation unit 42, the input accepting unit 44, and the memory 46 via a bus 48. The display controller 30 exchanges information with the timer 38, the display screen generation unit 42, the input accepting unit 44, and the memory 46 so as to control these components.

The timer 38 is a measurement device that measures a period taken to perform a setting operation for each function. The operation panel 40 includes various buttons, such as a start button and numeral buttons; a liquid crystal display for displaying various screens; and a touch panel. Arrangement of the individual components in the operation panel 40 will be described later. The operation panel 40 is connected to each of the display screen generation unit 42 and the input accepting unit 44.

The display screen generation unit 42 acquires screen data in accordance with an instruction given thereto from the display controller 30, and displays a screen based on the acquired screen data on the operation panel 40. The screen data is stored in the memory 46. The input accepting unit 44 accepts an operation performed by the user on the operation panel 40; identifies a set function, a set value, a pressed button, and so forth; and notifies the display controller 30 of the obtained information. For example, the input accepting unit 44 detects a touch of an object (the user's finger or the like) onto the touch panel, and identifies a selected function on the basis of an address of the position where the touch is detected.

When an instruction for starting a service process is accepted, the display controller 30 instructs the controller 12 of the service providing apparatus 10 to execute the service process. Based on the content of the service process, the controller 12 controls the image reading section 16, the image forming section 18, the sheet transporting section 20, the communication section 22, and the memory 24 so as to execute the service process.

The memory 46 stores various kinds of data. In this exemplary embodiment, the memory 46 stores screen data 50, an operation history 52, user information 54, and control data 56. The screen data 50 includes pieces of data that correspond to various screens to be displayed on the operation panel 40. Examples of the screens to be displayed on the operation panel 40 include a "service selection screen" that displays a list of available services, "setting screens" that display settable functions, and "guidance displaying screens" that will be described later.

The operation history 52 includes information that represents contents of operations that have been performed by each user. Every time the service providing apparatus 10 is used by a user, a new operation history record, which contains information about the set function, the set value, and the setting period, is acquired and is stored in association with the user. The new operation history record is added to the operation history 52, whereby the operation history 52 is updated. The operation history 52 will be described later using a specific example (see FIG. 8).

The user information 54 includes pieces of information used to authenticate each user in a login process. In the user information 54, a user name and a password are stored in association with each other. The control data 56 includes various kinds of data used when the display controller 30 executes a display control process. The various kinds of data may take forms of set values, tables, graphs, or the like. Examples of the control data 56 include an "initial value of each function" that is used when the set value is initialized, a "threshold" that is used when control is switched between, and a "condition" that is used for conditional branching.

Referring now to FIG. 3, an example of the configuration of the operation panel 40 will be described specifically. The operation panel 40 is arranged at an easy-to-operate position for the user, such as on an upper surface of the body of the service providing apparatus 10. As illustrated in FIG. 3, the operation panel 40 includes a touch panel 60 and buttons 70. Each of the buttons 70 is arranged in the vicinity of the touch panel 60. In the illustrated arrangement example, each of the buttons 70 is arranged on the right side of the touch panel 60.

The touch panel 60 has a function of a liquid crystal display. The function of a liquid crystal display allows the touch panel 60 to display a screen, such as a setting screen, thereon. When the user touches an image (a button) displayed on the touch panel 60, the touch panel 60 identifies a function or the like that is associated with the touched image in accordance with an address of the position where the touch is detected. Hereinafter, the action "to touch an image representing a button" is expressed as "to press a button".

The buttons 70 include numeral buttons 72, a start button 74, a reset button 76, a clear button 78, a login button 80, and a logout button 82. The configuration of the operation panel 40 is merely an example, and thus the configuration and arrangement of the individual components may be changed, such as an unnecessary button being removed or a new button being added. For example, instead of the login button 80 and the logout button 82, images for login and logout may be included in a service selection screen.

The numeral buttons 72 are used by the user to enter a value, such as the number of copies. The start button 74 is used to start execution of each service. The reset button 76 is used to reset the selected service and the set value of each function. The clear button 78 is used to clear the set value of each function. The login button 80 is used by the user to start a login process. The logout button 82 is used by the user to log out from the service providing apparatus 10.

Normal Service and Simple Service

Now, a "normal service" and a "simple service" will be described.

The service providing apparatus 10 provides multiple service processes. In this exemplary embodiment, a normal service and a simple service are prepared for some of the service processes. The simple service is a service prepared for users, such as unaccustomed users who are unaccustomed to using the service providing apparatus 10, users with poor eyesight, and users who do not use complicated settings. The following describes differences between the normal service and the simple service.

The normal service is a mode that allows the user to make settings for all functions provided in the service. Thus, a setting screen for the normal service (hereinafter, referred to as a "normal setting screen") includes buttons for making settings of all functions. In the normal service, a complicated setting or a special setting is made using various functions in combination. However, because buttons are arranged in multiple layers, the setting operation is complicated. Accordingly, an unaccustomed user takes some time to perform the setting operation.

The simple service is a mode that allows the user to make settings of some of all functions provided in the normal service. In the simple service, functions to be provided are limited to basic ones or convenient ones, and thus the number of functions settable in the simple service is less than that of the normal service. That is, functions settable in the simple service are also settable in the normal service but some of functions settable in the normal service are not settable in the simple service.

A setting screen for the simple service (hereinafter, referred to as a "simple setting screen") includes buttons for making settings of some functions, such as basic functions or convenient functions. Also, because the number of functions to be provided in the simple service is less than that of the normal service, the buttons for the provided services are displayed as a list. This allows an unaccustomed user to perform the setting operation more easily. Furthermore, the individual functions are displayed using large characters and large buttons. This allows a user with poor eyesight to perform the setting operation more easily.

In the related art, even when the simple service is prepared for a service process, the normal service and the simple service are not properly used. As a result, the simple service is not effectively used. There are users who select the normal service even though their desired function is settable in the simple service and consequently take some time to perform the setting operation.

In this exemplary embodiment, in the case where a service process for which the simple service is prepared is executed, a message, which recommends a user who in the normal service has made settings of functions that are settable in the simple service to use the simple service, is displayed to the user. The message that recommends the user to use the simple service makes opportunity for the user to use the simple service, leading to effective utilization of the simple service.

Service Selection Screen

Figure 4:
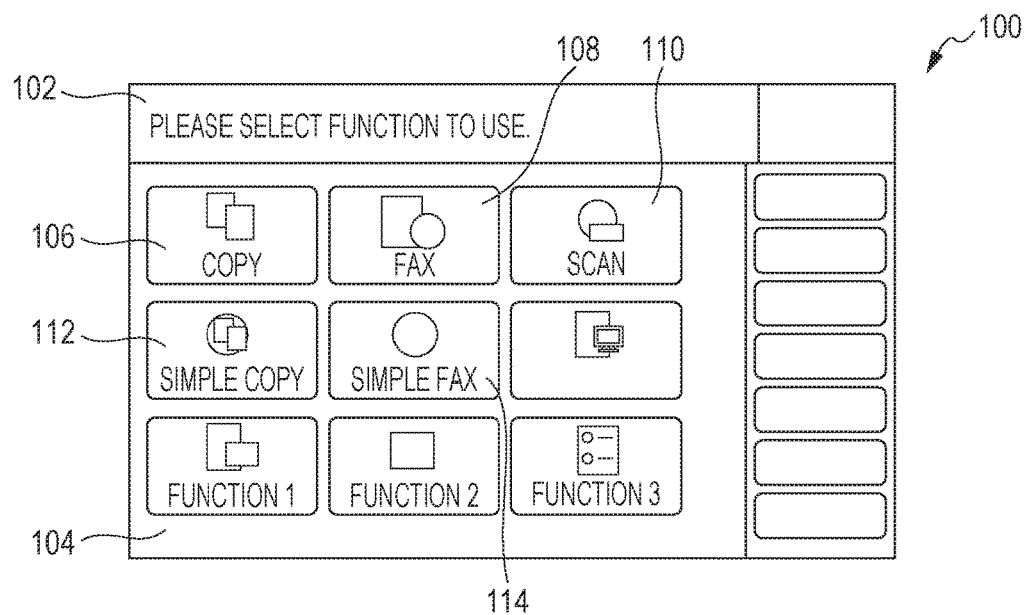
FIG. 4 is a schematic diagram illustrating an example of a service selection screen.

FIG. 4 is a schematic diagram illustrating an example of a service selection screen. As illustrated in FIG. 4, a service selection screen 100 is a screen that displays a list of service processes to be selected and is also called a menu screen. The service selection screen 100 has a message display portion 102 and a selection target display portion 104. The selection target display portion 104 displays multiple buttons, which include a copy selection button 106, a fax selection button 108, a scan selection button 110, a simple copy selection button 112, and a simple fax selection button 114.

In the example illustrated in FIG. 4, the normal service and the simple service are prepared for two services, namely, the copy process and the fax process. Regarding these service processes, one of the normal service and the simple service is used in accordance with selection made by the user. The following specifically describes a normal setting screen used in normal copy and a simple setting screen used in simple copy.

Normal Setting Screen

Figure 5A:
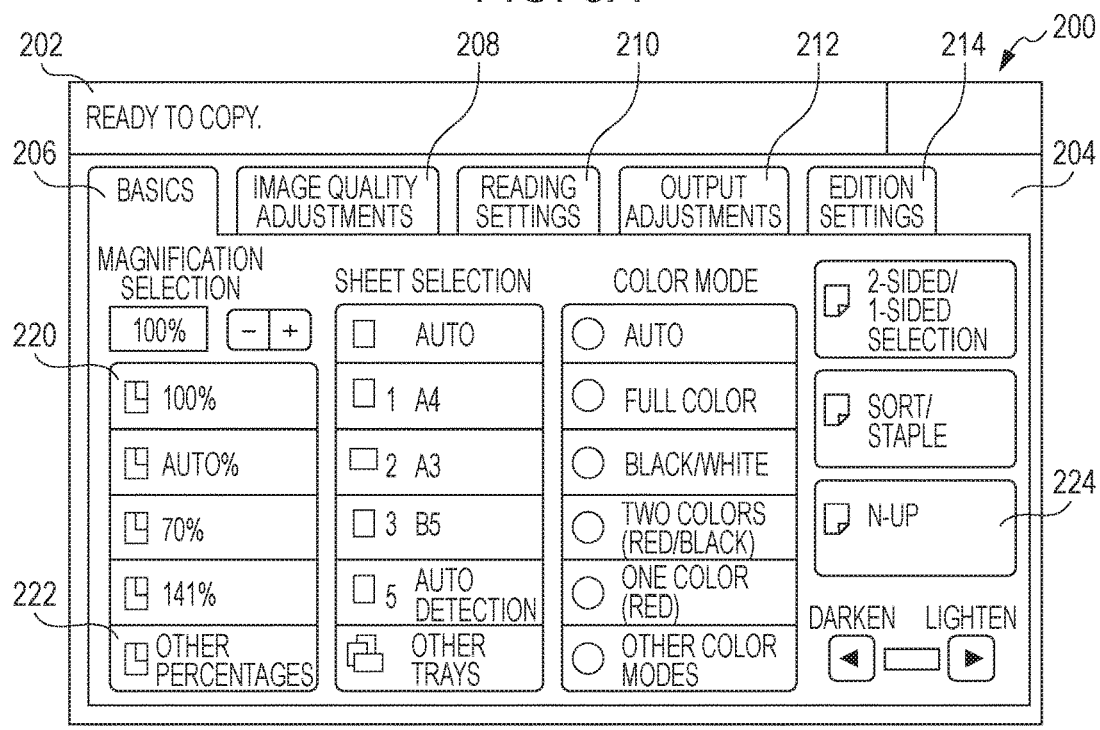
FIGS. 5A and 5B are schematic diagrams illustrating examples of normal setting screens used in normal copy.
Figure 5B:
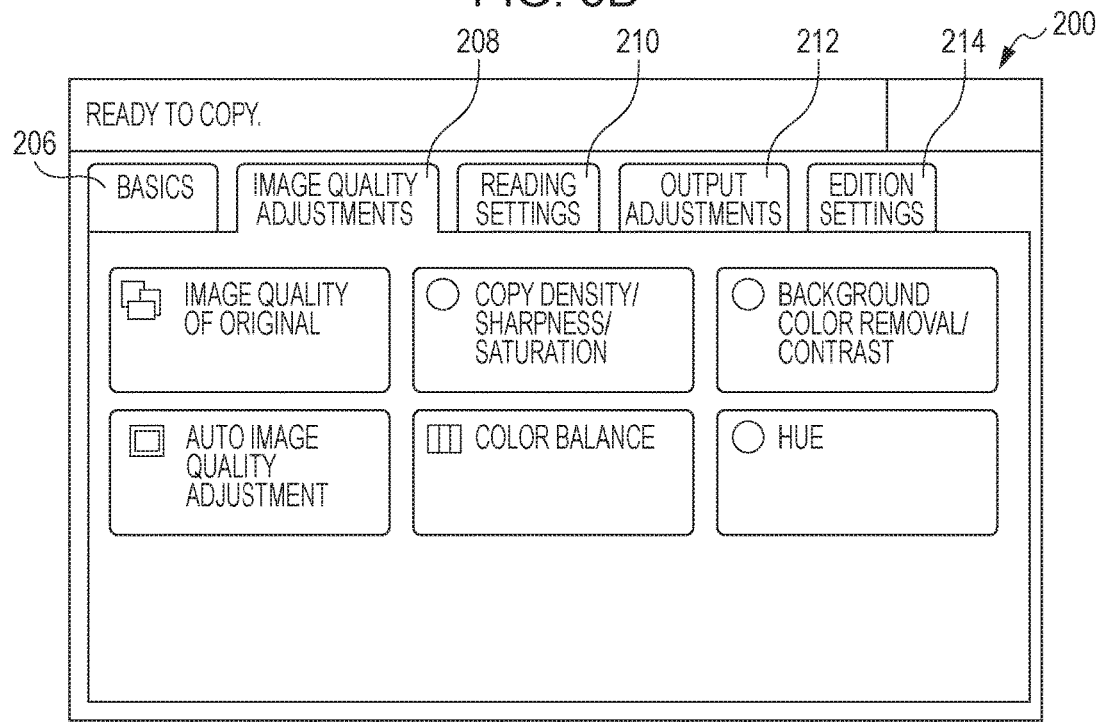

FIGS. 5A and 5B are schematic diagrams illustrating examples of the normal setting screens used in normal copy. Upon the copy selection button 106 being pressed on the service selection screen 100 illustrated in FIG. 4, the service selection screen 100 changes to a normal setting screen 200 illustrated in FIG. 5A.

The normal setting screen 200 includes a message display portion 202 and a selection target display portion 204. The selection target display portion 204 displays a basic settings screen 206, an image quality adjustments screen 208, a reading settings screen 210, an output adjustments screen 212, and an edition settings screen 214. Each of the basic settings screen 206, the image quality adjustments screen 208, the reading settings screen 210, the output adjustments screen 212, and the edition settings screen 214 has a tab button for displaying the screen, buttons used to set various functions, and value accepting parts that accept set values.

Upon a button displayed on the normal setting screen 200 being pressed, a function setting is made or the displayed screen changes to a parallel layer screen, a lower layer screen, or an option displaying screen. Here, the "function setting" includes setting of a value associated with the function. As illustrated in FIG. 5A, the basic settings screen 206 is displayed first when the displayed screen changes from the service selection screen 100.

For example, as a result of a button 220 that displays "100%" in a magnification selection portion being pressed on the basic settings screen 206, a value "100%" is set for a settable function "magnification selection". Also, as a result of a tab button that displays "image quality adjustments" being pressed, the basic settings screen 206 changes to the image quality adjustments screen 208 as illustrated in FIG. 5B.

As a result of a button 222 that displays "other percentages" in the magnification selection portion being pressed on the basic settings screen 206, the displayed screen changes to a magnification selection screen (not illustrated), which includes buttons and value accepting parts for setting a magnification format in which the vertical and horizontal magnifications are separately set and for setting a fixed magnification ratio, such as the A3 size to the A4 size. The magnification selection screen is a lower layer screen of the basic settings screen 206. Also, as a result of a button 224 that displays "N-up" being pressed, the basic settings screen 206 changes to a selection screen (not illustrated), which displays buttons for selecting "off", "2-up", "4-up", and so forth. This selection screen is an option displaying screen of the basic settings screen 206.

Each of the image quality adjustments screen 208, the reading settings screen 210, the output adjustments screen 212, and the edition settings screen 214 is a parallel layer screen of the basic settings screen 206. As a result of the corresponding tab button being pressed, the displayed screen changes to the reading settings screen 210, the output adjustments screen 212, or the edition settings screen 214.

As in the basic settings screen 206, a function setting is made or the displayed screen changes to a parallel layer screen, a lower layer screen, or an option displaying screen regarding the image quality adjustments screen 208, the reading settings screen 210, the output adjustments screen 212, and the edition settings screen 214.

As describes above, the normal setting screen 200 has buttons used to set all functions provided in the normal service. The user who uses the normal setting screen 200 first displays a parallel layer screen to set a desired function. Then, the user displays a lower layer screen or an option displaying screen in order to set the function on the displayed parallel layer screen, thereby making a setting for the desired function, although the function may be set on the displayed parallel layer screen. Accordingly, an unaccustomed user takes a long time to perform the setting operation.

Simple Setting Screen

Figure 6:
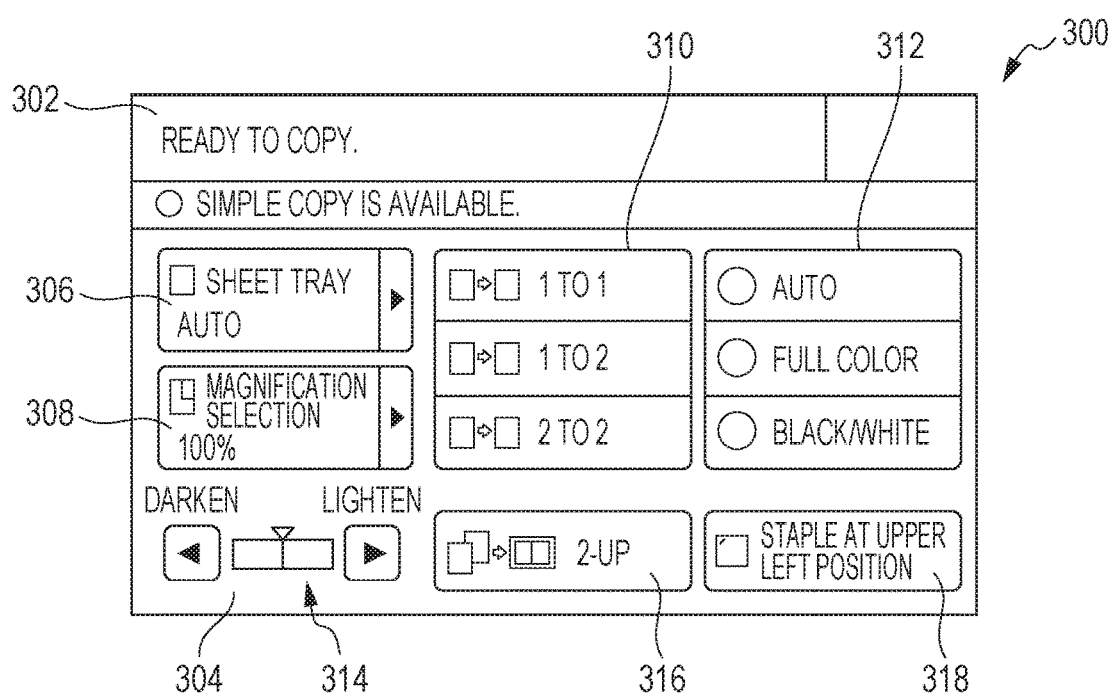
FIG. 6 is a schematic diagram illustrating an example of a simple setting screen used in simply copy.

FIG. 6 is a schematic diagram illustrating an example of the simple setting screen used in simple copy. Upon the simple copy selection button 112 being pressed on the service selection screen 100 illustrated in FIG. 4, the service selection screen 100 changes to a simple setting screen 300 illustrated in FIG. 6. The simple setting screen 300 includes buttons used to set some of all functions provided in the normal service. Functions that are settable in the simple service are also settable in the normal service.

In the example illustrated in FIG. 6, the simple setting screen 300 includes a message display portion 302 and a selection target display portion 304. The selection target display portion 304 displays a sheet selection portion 306, a magnification selection portion 308, a single-sided/double-sided selection portion 310, a color mode selection portion 312, a density setting portion 314, a button 316, and a button 318.

The sheet selection portion 306 and the magnification selection portion 308 each display multiple options (buttons) in a pull-down format, for example. As a result of one of the buttons being pressed, a function and a value associated with the button are set. The single-sided/double-sided selection portion 310 has buttons that allow selection of "1 to 1 (single-sided originals to single-sided copies)", "1 to 2 (single-sided originals to double-sided copies)", and "2 to 2 (double-sided originals to double-sided copies)". The color mode selection portion 312 has buttons that allow selection of "auto", "full color", and "black/white". The button 316 is a button used to set the "2-up" function. The button 318 is a button used to set the function of stapling at an upper left position.

As a result of a button displayed on the simple setting screen 300 being pressed, a function is set or the displayed screen changes to a lower layer screen or an option displaying screen. Functions that are settable on the simple setting screen 300 are limited to basic functions, convenient functions, or the like. Also, the simple setting screen 300 displays the settable functions as a list. Thus, the simple setting screen 300 makes it easier for an unaccustomed user to perform the setting operation than the normal setting screen 200.

Operation Performed by Display Controller

Now, an operation performed by the display controller 30 will be described.

The CPU 32 of the display controller 30 reads out a control program for executing a "display control process" or the like from the ROM 34, and executes the program by using the RAM 36 as a work area. Herein, a description will be given using the normal setting screen and the simple setting screen of the copy process but it is sufficient if the normal service and the simple service are prepared for a service process. The service process is not limited to the copy process and may be the fax process, for example.

Overview of Display Control Process

FIG. 7 is a flowchart illustrating a procedure of the "display control process" according to the first exemplary embodiment of the present invention. The "display control process" starts in response to acceptance of a login request from the user. Here, an overview of the procedure of the display control process will be described based on an assumption that an instruction for starting a service process is given after the user finishes setting functions.

As illustrated in FIG. 7, in step S100, the display controller 30 executes a "login process" in which authentication is performed on the user, in response to a login request made by the user. In this exemplary embodiment, when the user presses the login button 80, the login request is accepted. It is assumed here that the user is permitted to log in. In step S102, the display controller 30 executes a "setting accepting process" in which a setting operation performed by the user is accepted through the operation panel 40. When the user presses the start button 74 after the setting accepting process ends, an instruction for starting the service process is accepted.

In response to acceptance of an instruction for starting a service process, the display controller 30 instructs the controller 12 of the service providing apparatus 10 to execute the service process in step S104. In step S106, the display controller 30 displays an in-execution screen (not illustrated) on the touch panel 60. This in-execution screen informs the user that the service process is being executed. In step S108, the display controller 30 executes a "guidance display process" in which a guidance displaying screen is displayed. Here, the "guidance displaying screen" displays a message that recommends the use of the simple service. This guidance displaying screen is displayed to users who are suited to using the simple service.

In step S110, the display controller 30 determines whether or not a logout request is made by the user. In this exemplary embodiment, when the user presses the logout button 82, a logout request is accepted. If a logout request is made, the display controller 30 terminates the routine of the display control process. If no logout request is made, the process returns to step S102 and the display controller 30 repeatedly performs steps S102 to S110 until it accepts a logout request. After terminating the routine of the display control process, the display controller 30 displays an initial screen, a standby screen, or the like on the touch panel 60.

In this exemplary embodiment, when it is determined that the user is suited to using the simple service, the guidance displaying screen is displayed on the touch panel 60 after the user finishes the setting operation. As described below, whether or not the user is suited to using the simple service is determined in accordance with a history of settings made by the user. The subroutines, namely, the "login process", the "setting accepting process", and the "guidance display process", will be described below.

Login Process

Now, the "login process" will be described.

Figure 9:
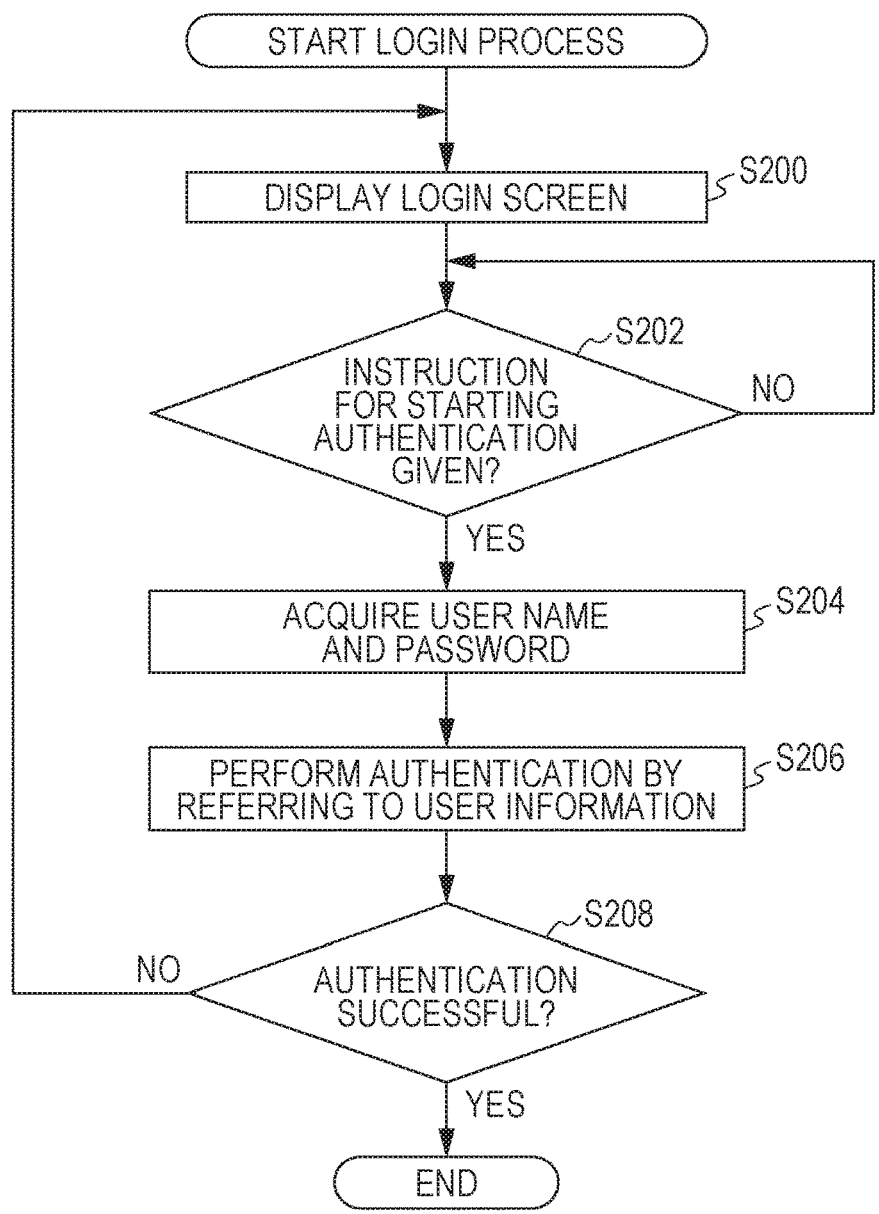
FIG. 9 is a flowchart illustrating a procedure of a login process.

FIG. 9 is a flowchart illustrating a procedure of the "login process". The "login process" starts in response to acceptance of a login request from the user. As illustrated in FIG. 9, in step S200, the display controller 30 displays a login screen (not illustrated) on the touch panel 60. The login screen requests the user to enter information necessary for authentication of the user. In this exemplary embodiment, the login screen requests the user to enter the user name and the password. When the user presses the start button 74 after entering the user name and the password, an instruction for starting authentication is accepted.

In step S202, the display controller 30 determines whether or not an instruction for starting authentication is accepted. If the instruction is accepted, the process proceeds to step S204 and the display controller 30 acquires the user name and the password. If the instruction is not accepted, the process returns to step S202. Step 202 is repeatedly performed until the instruction for starting authentication is accepted.

After acquiring the user name and the password in step S204, the process proceeds to step S206. In step S206, the display controller 30 refers to the user information 54 stored in the memory 46 to perform authentication. Specifically, based on the user information 54, the display controller 30 determines whether or not the acquired user name and password match a user name and a password contained in the user information 54. If the user names and passwords match, authenticates is successful. If the user names and passwords do not match, authentication is not successful. In step S208, the display controller 30 determines whether or not authentication is successful. If authentication is successful, the display controller 30 terminates the routine of the login process.

If the authentication is not successful, the process returns to step S200 and the display controller 30 displays the login screen (not illustrated) on the touch panel 60 again. The display controller 30 then repeats steps S200 to S208 until the user is authenticated. Alternatively, if authentication is not successful after steps S200 to S208 are performed multiple times, the display controller 30 may terminate the routine of the login process. Also, the login process may be performed using information read from an IC chip or a code attached to a card or the like carried by the user.

Setting Accepting Process

Now, the "setting accepting process" will be described.

Figure 10:
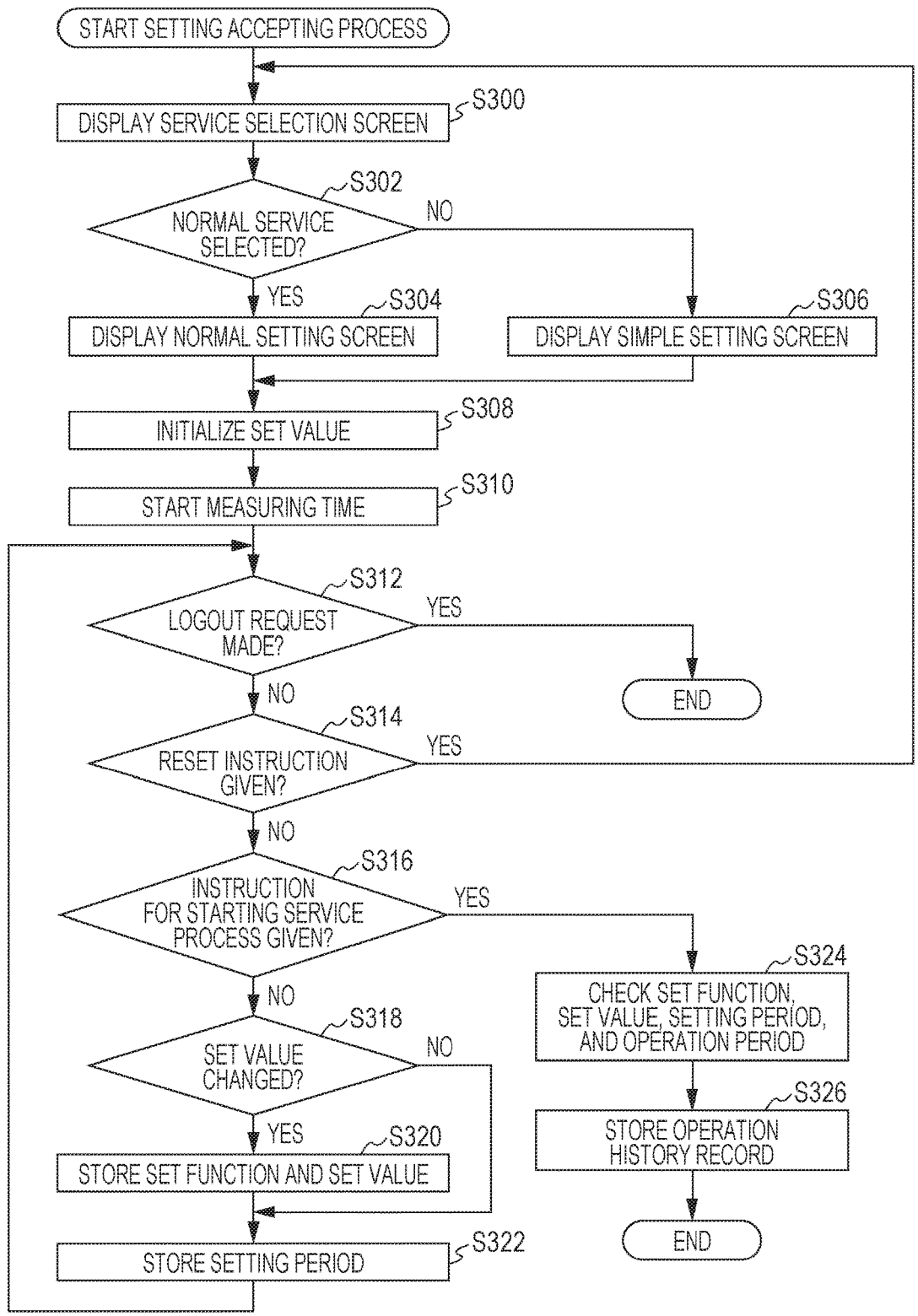
FIG. 10 is a flowchart illustrating a procedure of a setting accepting process.

FIG. 10 is a flowchart illustrating a procedure of the "setting accepting process". The "setting accepting process" starts after the user logs in. As illustrated in FIG. 10, in step S300, the display controller 30 displays the service selection screen 100 (see FIG. 4) on the touch panel 60. When the user presses a service selection button, selection of a service is accepted.

In step S302, the display controller 30 determines whether or not the normal service is selected. If the normal service is selected, the process proceeds to step S304. In step S304, the display controller 30 displays the normal setting screen 200 (see FIG. 5A) on the touch panel 60 and then the process proceeds to step S308. If the simple service is selected, the process proceeds to step S306. In step S306, the display controller 30 displays the simple setting screen 300 (see FIG. 6) on the touch panel 60 and then the process proceeds to step S308.

In step S308, the display controller 30 initializes set values of functions. "Initial values of functions" used when the set values are initialized are stored in the memory 46 as the control data 56. In step S310, the display controller 30 starts the timer 38 to measure a time period and then the process proceeds to step S312. Starting of the timer 38 indicates starting of a setting operation.

When the user presses a button, processing is performed in accordance with the pressed button in the setting accepting process. Accordingly, which button is pressed, that is, what instruction is given, is determined sequentially. In step S312, the display controller 30 determines whether or not a logout request is made by the user. In this exemplary embodiment, when the user presses the logout button 82, a logout request is accepted. If a logout request is made, the display controller 30 terminates the routine of the display control process as illustrated in FIG. 7. On the other hand, if no logout request is made, the process proceeds to step S314.

In step S314, the display controller 30 determines whether or not a reset instruction is given by the user. In this exemplary embodiment, when the user presses the reset button 76, a reset instruction is accepted. If the reset instruction is given, the process returns to step S300 and the display controller 30 displays the service selection screen 100 on the touch panel 60 again. On the other hand, if no reset instruction is given, the process proceeds to step S316.

In step S316, the display controller 30 determines whether or not an instruction for starting a service process is given by the user. In this exemplary embodiment, when the user presses the start button 74, an instruction for starting a service process is accepted. The user gives an instruction for starting a service process after finishing setting the functions. Accordingly, if no instruction for starting a service process is given, the process proceeds to step S318, in which the display controller 30 determines whether or not a set value is changed. In this exemplary embodiment, when the user presses a function selection button on the normal setting screen or the simple setting screen, the change of the set value is accepted.

If the set value is changed, the process proceeds to step S320, in which the changed function (set function) and the changed set value are stored in the RAM 36. In step S322, a setting period is stored in the RAM 36. If the set value is not changed, step S320 is skipped and the process proceeds to step S322, in which the setting period is stored in the RAM 36. If the set value is changed and thereafter is returned to the initial value, such as in the case where a function selection button is pressed and thereafter this operation is cancelled, the set function and the set value need not be recorded in the operation history. Thus, the display controller 30 determines that the set value is not changed.

After the setting period is stored in step S322, the process returns to step S312. The display controller 30 repeatedly performs steps S312 to S322. In this way, the functions are sequentially set and the set functions and the set values thereof are sequentially stored. Also, the setting periods of the functions are sequentially stored. Here, the "setting period" is a period (a pressing interval) from when one function selection button is pressed to when a next function selection button is pressed. In the case where a function is selected for the first time, a period from when the setting operation is started to when the function selection button is pressed is treated as the "setting period".

If an instruction for starting a service process is given in step S316, the process proceeds to step S324, in which the display controller 30 checks the set functions, the set values, the setting periods, and an operation period. Here, the "operation period" is a period from when the setting operation is started to when an instruction for starting a service process is given. In step S326, the display controller 30 stores an operation history record containing information about the set functions, the set values, the setting periods, and the operation period in the memory 46 in association with the user. Specifically, the display controller 30 adds the latest operation history record of the user to the operation history 52 so as to update the operation history 52 stored in the memory 46. After storing the operation history record in step S326, the display controller 30 terminates the routine of the "setting accepting process".

In the case where the user uses the service providing apparatus 10 for the first time and no operation history of the user is found, a record regarding the operation performed by the user may be stored in the RAM 36 or the memory 46 in order to use the latest operation history record of the user in the "guidance display process" to be performed subsequently.

Referring now to FIG. 8, an example of a table that stores an operation history will be described. In the example illustrated in FIG. 8, each user and an operation history of the user are stored in association with each other. The user is represented by identification information that enables identification of the user, for example, the user name or the user identification number (ID). The operation history may be any history information that indicates the state of an operation performed by the user. In the example illustrated in FIG. 8, the operation date and time, the selected service, the set functions, the set values, and the setting periods are stored as an operation history record. This example illustrates operation history records of the copy process but the service process is not limited to the copy process.

Guidance Display Process

Now, the "guidance display process" will be described.

Figure 11:
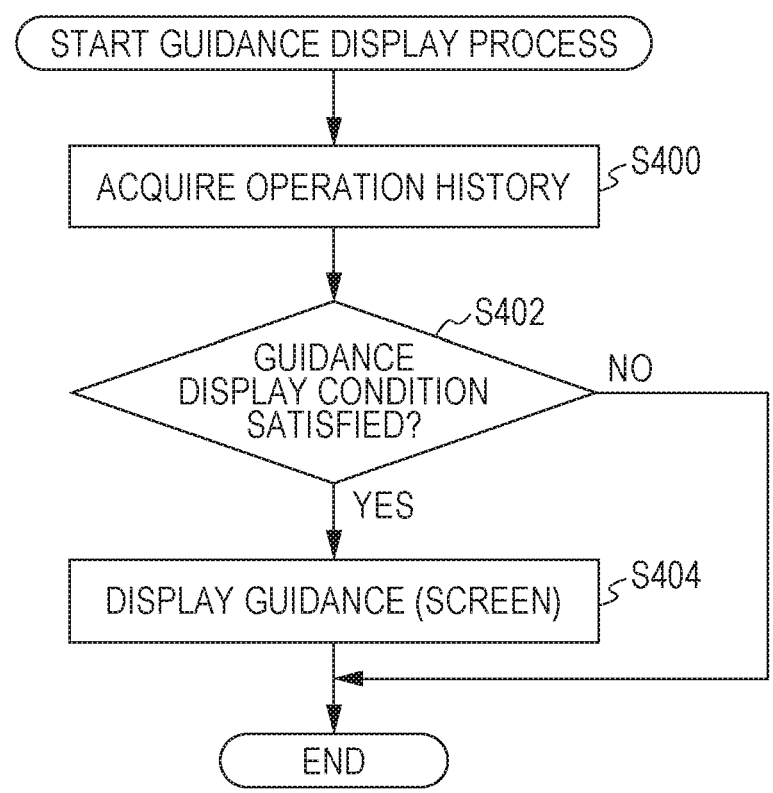
FIG. 11 is a flowchart illustrating a procedure of a guidance display process.

FIG. 11 is a flowchart illustrating a procedure of the "guidance display process". In this exemplary embodiment, the "guidance display process" starts after the user finishes the setting operation. As illustrated in FIG. 11, in step S400, the display controller 30 acquires an operation history.

In step S402, the display controller 30 determines whether or not a guidance display condition for displaying a guidance that recommends the user to use the simple service is satisfied. In this exemplary embodiment, the "guidance display condition" is a condition regarding whether or not every function set in the normal service is settable in the simple service. Based on the latest operation history of the user, the display controller 30 determines whether or not the "guidance display condition" is satisfied. Specifically, if every function set in the normal service is settable in the simple service, it is determined that the guidance display condition is satisfied.

For example, referring to FIG. 8, a user ABC who used the normal copy on Jan. 4, 2012 set "1 to 2 (single-sided originals to double-sided copies)" for the double-sided/single-sided selection, "100%" for the magnification selection, and "full color" for the color mode. All of these functions are settable in the simple copy. Thus, it is determined that the guidance display condition was satisfied when the service providing apparatus 10 was used on Jan. 4, 2012.

If the guidance display condition is satisfied, the process proceeds to step S404, in which the display controller 30 displays the guidance displaying screen on the touch panel 60. The guidance message that recommends the use of the simple service is displayed to users who are suited to using the simple service. On the other hand, if the guidance display condition is not satisfied, the display controller 30 terminates the routine of the "guidance display process" without displaying the guidance displaying screen.

The condition regarding whether or not every function set in the normal service is settable in the simple service is used as the "guidance display condition" above but an additional guidance display condition may be further used. For example, conditions regarding whether or not every function set in the normal service is settable in the simple service and whether or not a setting period of each function is longer than or equal to a predetermined period may be used as the "guidance display conditions".

In the example illustrated in FIG. 8, regarding the user ABC who used the normal copy on Jan. 4, 2012, the setting period of the double-sided/single-sided selection is "30 seconds", the setting period of the magnification selection is "15 seconds", and the setting period of the color mode is "45 seconds". In general, a period taken to set one function is several seconds. For example, when the predetermined period is "5 seconds", these setting periods are longer than the predetermined period. Thus, it is determined that the guidance display conditions are satisfied.

Figure 12A:
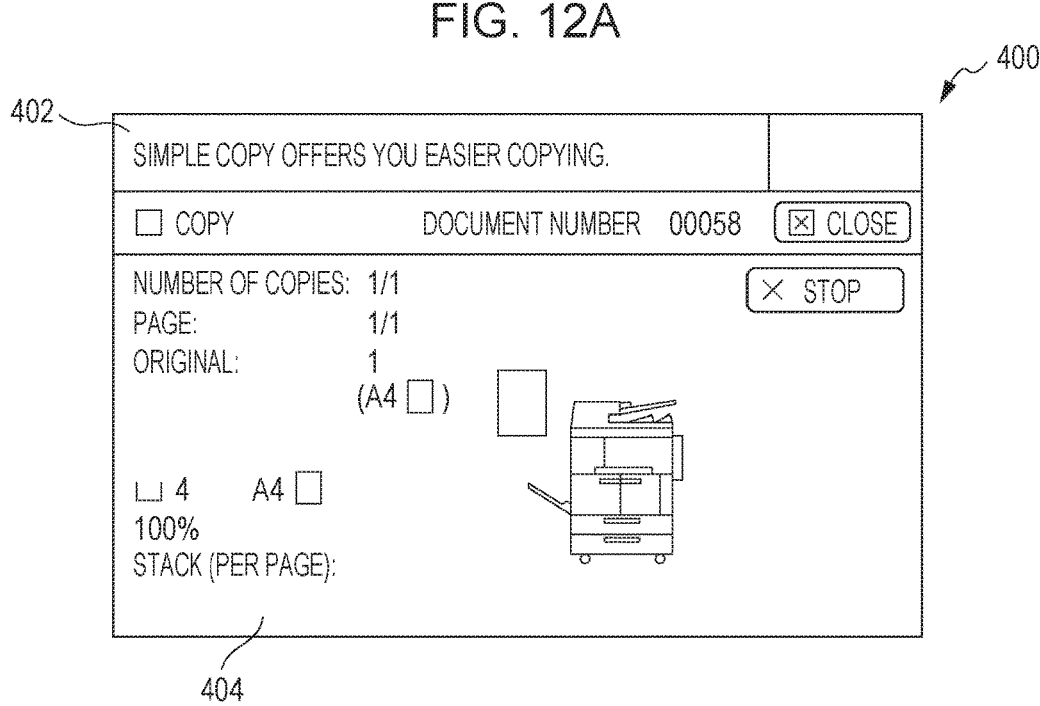
FIGS. 12A and 12B are schematic diagrams illustrating examples of a guidance displaying screen that is displayed after a setting operation is performed.
Figure 12B:
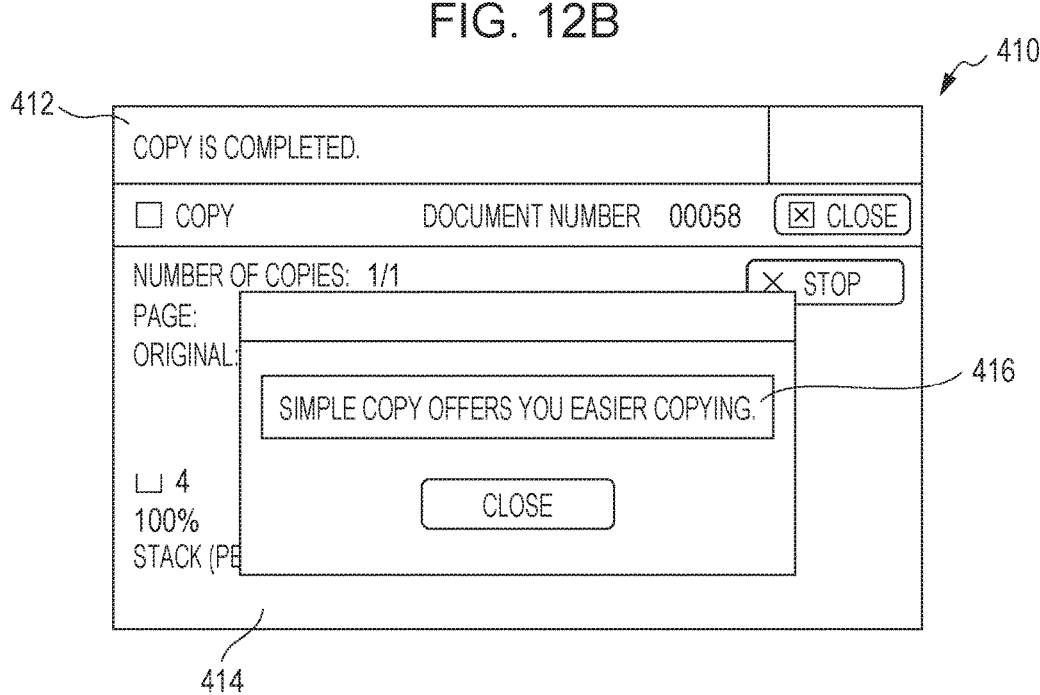

Now, the "guidance displaying screen" will be described. FIGS. 12A and 12B are schematic diagrams illustrating examples of a guidance displaying screen that is displayed after the setting operation is finished. A guidance displaying screen 400 illustrated in FIG. 12A includes a message display portion 402 and an execution state display portion 404. In this example, the message display portion 402 displays a message "Simple copy offers you easier copying" or the like, thereby displaying a guidance that recommends the user to use the simple service. Also, the execution state display portion 404 displays the execution state of the service process, such as that the service process is being executed or execution of the service process is finished.

A guidance displaying screen 410 illustrated in FIG. 12B includes a message display portion 412, an execution state display portion 414, and a popup screen 416. The popup screen 416 is a window that is displayed so as to be superimposed on the execution state display portion 414 and that is smaller than the execution state display portion 414. In this example, the popup screen 416 displays a message "Simple copy offers you easier copying" or the like, thereby displaying a guidance that recommends the user to use the simple service.

Second Exemplary Embodiment

In the first exemplary embodiment, the example has been described in which a guidance displaying screen is displayed after the user finishes a setting operation. In a second exemplary embodiment, a guidance displaying screen is displayed to the user whose operation history is not found after the user finishes a setting operation, whereas the guidance displaying screen is displayed to the user whose operation history is found before the user starts a setting operation.

In the case of the initial use, whether or not to display the guidance displaying screen that recommends the user to use the simple service is determined in accordance with an operation history regarding one setting operation and the guidance displaying screen is displayed after the setting operation is finished. In contrast, in the case of the second or following use, whether or not to display the guidance displaying screen that recommends the user to use the simple service is determined in accordance with an operation history regarding multiple setting operations and the guidance displaying screen is displayed to the user before the user starts a setting operation.

Operation Performed by Display Controller

Now, an operation performed by the display controller 30 will be described.

Figure 13:
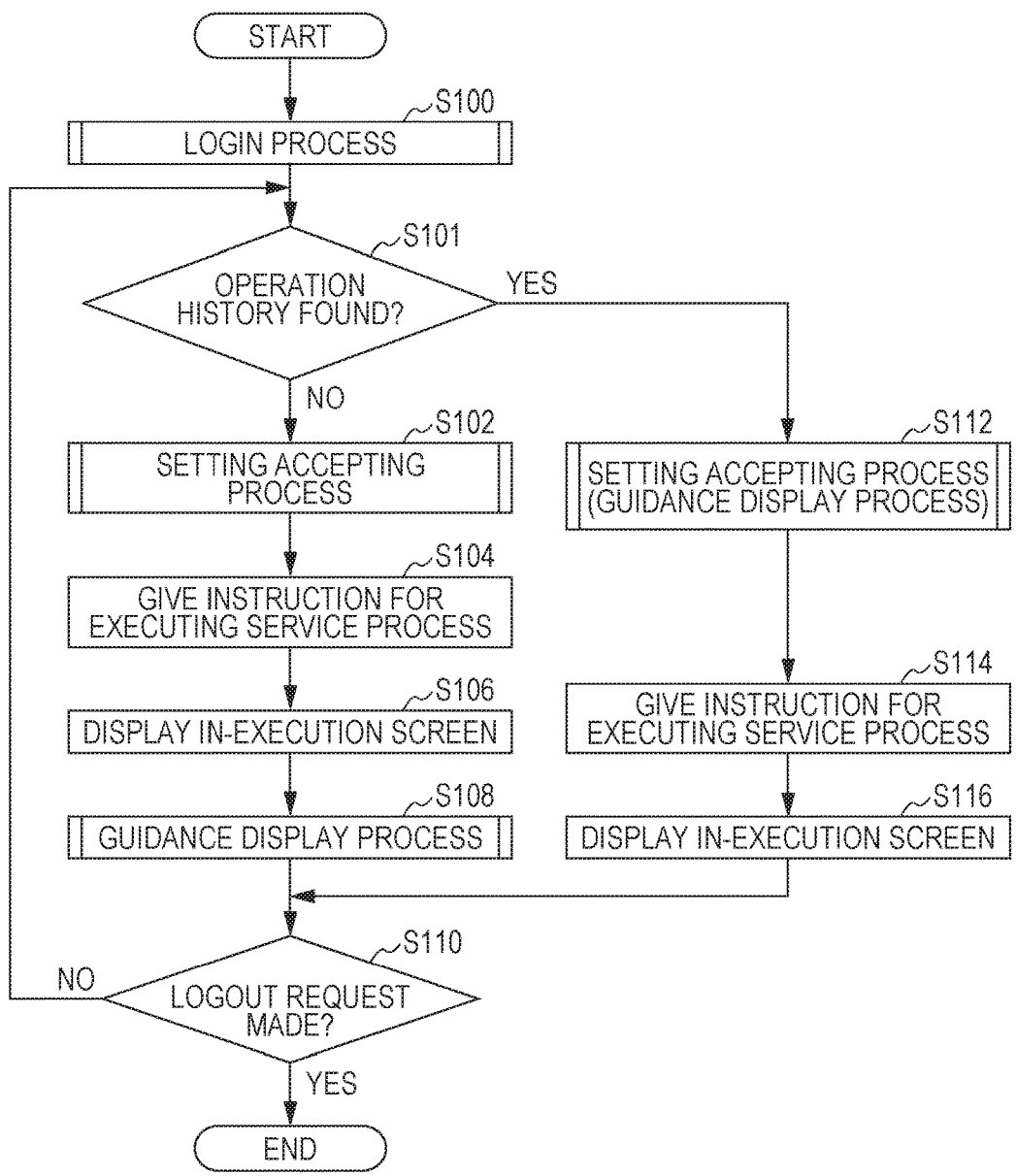
FIG. 13 is a flowchart illustrating a procedure of a display control process according to a second exemplary embodiment of the present invention.

FIG. 13 is a flowchart illustrating a procedure of a "display control process" according to the second exemplary embodiment of the present invention. The "display control process" starts in response to acceptance of a login request from the user. Here, an overview of the procedure of the display control process will be described. Steps that are the same as those of FIG. 7 are assigned the same reference numerals and a description thereof is omitted.

As illustrated in FIG. 13, the display controller 30 executes the "login process" in step S100. In step S101, the display controller 30 determines whether or not an operation history of the user who has logged in is found. If it is determined that no operation history is found, the process proceeds to step S102, in which the "setting accepting process" is executed. In step S104, the display controller 30 instructs the controller 12 to execute the service process. In step S106, the display controller 30 displays the in-execution screen (not illustrated) on the touch panel 60. In step S108, the display controller 30 executes the "guidance display process" and then the process proceeds to step S110.

On the other hand, if it is determined that an operation history of the user who has logged in is found in step S101, the process proceeds to step S112. In step S112, the display controller 30 executes a "setting accepting process" in which a setting operation performed by the user is accepted. In this exemplary embodiment, the "guidance display process" is executed within the "setting accepting process" as described below. After accepting an instruction for starting a service process, the display controller 30 instructs the controller 12 to execute the service process in step S114. The display controller 30 displays the in-execution screen (not illustrated) on the touch panel 60 in step S116, and the process then proceeds to step S110.

In step S110, the display controller 30 determines whether or not a logout request is made by the user. If a logout request is made, the display controller 30 terminates the routine of the display control process. On the other hand, if no logout request is made, the process returns to step S101 and the display controller 30 repeatedly performs steps S101 to S116 until it accepts a logout request.

In this exemplary embodiment, in the case where the user uses the service providing apparatus 10 for the second time or more, it is determined based on the operation history whether or not the user is suited to using the simple service. If the user is suited to using the simple service, the guidance displaying screen is displayed on the touch panel 60 before the user starts a setting operation.

Figure 14A:
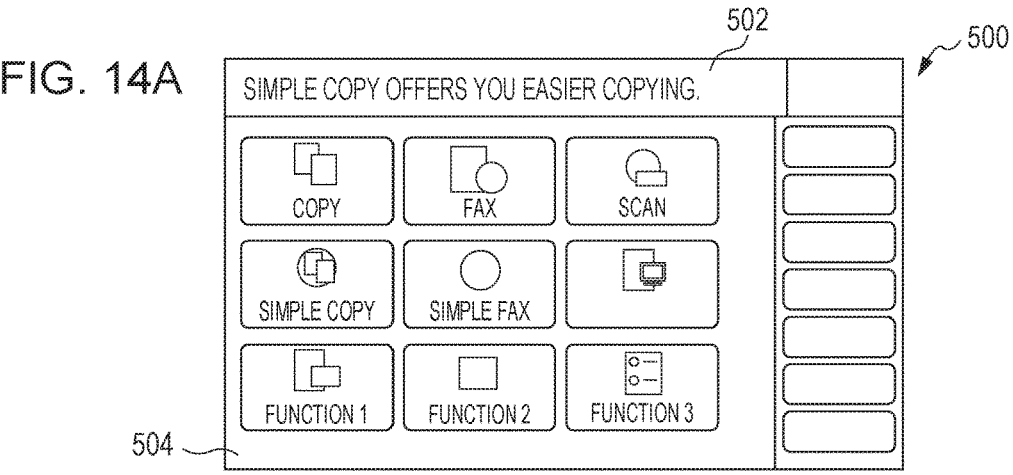
FIGS. 14A to 14C are schematic diagrams illustrating examples of a guidance displaying screen that is displayed before a setting operation is performed.
Figure 14B:
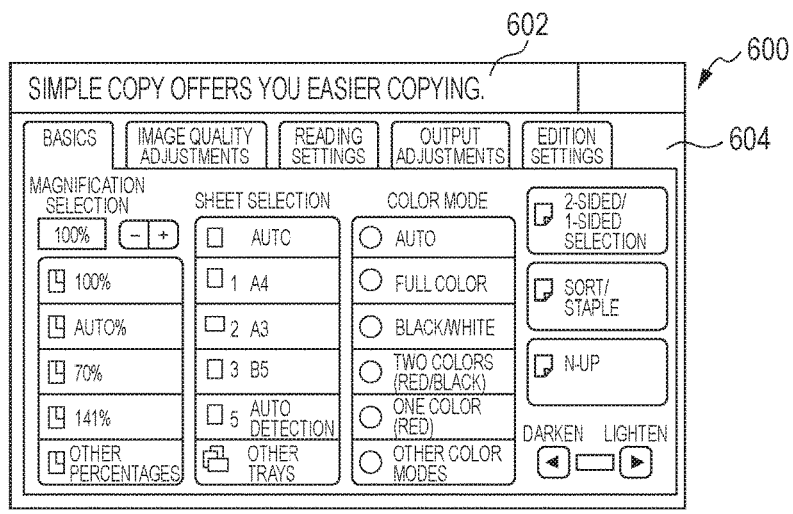
Figure 14C:
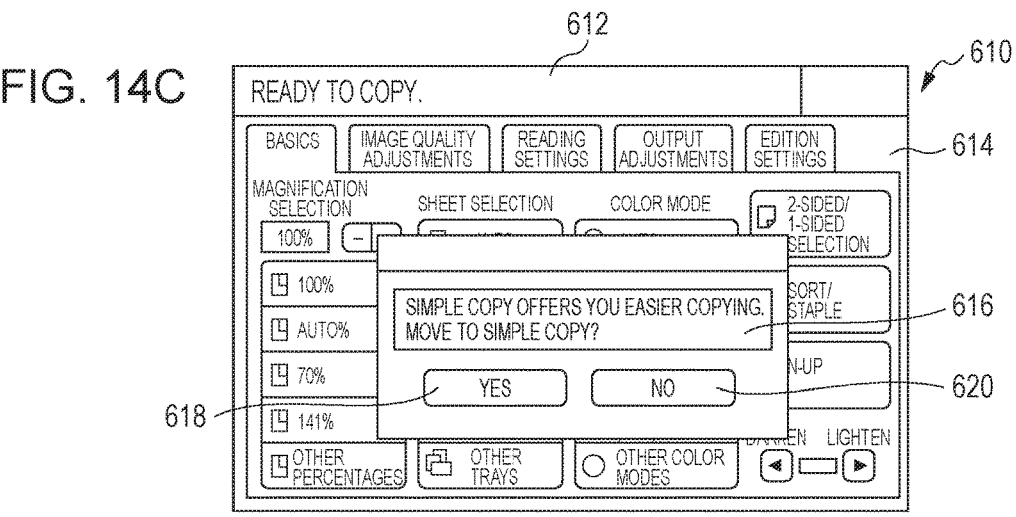

Referring to FIG. 10, the "guidance display process" performed within the "setting accepting process" will be described. FIGS. 14A to 14C are schematic diagrams illustrating examples of a guidance displaying screen that is displayed before a setting operation is performed. In this exemplary embodiment, the guidance displaying screen is displayed before the user starts a setting operation.

For example, the "guidance display process" may be executed when the service selection screen is displayed in step S300 of FIG. 10. Before displaying the service selection screen in step S300, the display controller 30 acquires an operation history of the user and determines whether or not the guidance display condition is satisfied in accordance with the operation history. If the guidance display condition is satisfied, the display controller 30 displays a message "Simple copy offers you easier copying" or the like at a message display portion 502 of a service selection screen 500 as illustrated in FIG. 14A, thereby displaying a guidance that recommends the user to use the simple service. Also, the display controller 30 may change the color of simple service selection buttons among buttons displayed in a selection target display portion 504 of the service selection screen 500 or the like so that the simple service selection buttons stand out.

Alternatively, the display controller 30 may execute the "guidance display process" when the normal setting screen is displayed in step S304 of FIG. 10. In this case, before the normal setting screen is displayed in step S304, the display controller 30 acquires an operation history of the user and determines whether or not the guidance display condition is satisfied in accordance with the operation history. If the guidance display condition is satisfied, the display controller 30 displays a message "Simple copy offers you easier copying" or the like in a message display portion 602 of a normal setting screen 600 as illustrated in FIG. 14B, thereby displaying a guidance that recommends the user to use the simple service. In this case, no change is made on a selection target display portion 604.

In the case where the "guidance display process" is executed when the normal setting screen is displayed, a normal setting screen 610 that has a popup screen 616 may be displayed as illustrated in FIG. 14C. The popup screen 616 is a window that is displayed so as to be superimposed on an execution state display portion 614 and that is smaller than the execution state display portion 614. In this example, a message "Simple copy offers you easier copying" or the like is displayed in the popup screen 616, whereby a guidance that recommends the user to use the simple service is displayed.

Also, in this example, the popup screen 616 displays a message "Move to simple copy?" and selection buttons so that one of the simple setting screen and the normal setting screen is selected. If an agreement button 618 that displays "Yes" is pressed, the displayed screen changes to the simple setting screen. If a denial button 620 that displays "No" is pressed, the setting operation is continuously performed on the normal setting screen.

In the case where the guidance display screen is displayed before the user starts a setting operation, it is determined based on an operation history regarding multiple setting operations whether or not the user is suited to using the simple service. Here, a "guidance display condition" that is the same as or that is different from the "guidance display condition" of the first exemplary embodiment may be set. For example, a condition regarding whether or not a ratio of functions settable in the simple service to all set functions is greater than or equal to a predetermined value may be used as the "guidance display condition". When this condition is used, the use of the simple service is recommended if the ratio of functions settable in the simple service to all set functions is greater than or equal to the predetermined value.

In the example illustrated in FIG. 8, the user ABC who used the normal copy on Jul. 15, 2012 also used the normal copy on Jan. 4, 2012. The double-sided/single-sided selection function "2 to 1 (double-sided originals to single-sided copies)" used in the normal copy on Jul. 15, 2012 is a function that is not settable in the simple copy. Thus, the ratio of functions settable in the simple service is "75%" (herein, the ratio is expressed using percentages). Suppose that the predetermined value is 70%. Then, the ratio of functions settable in the simple service is greater than the predetermined value. Thus, it is determined that the user ABC satisfied the guidance display condition at the time point of Jul. 15, 2012. That is, it is determined that the user ABC was suited to using the simple service.

Also, a user XYZ who used the normal copy on Jul. 15, 2012 also used the normal copy on Apr. 1, 2012. The double-sided/single-sided selection function "2 to 1 (double-sided originals to single-sided copies)" and the N-up function "4-up" used in the normal copy on Apr. 1, 2012 are functions that are not settable in the simple copy. Thus, the ratio of the number of functions settable in the simple service is "33%", which is lower than the predetermined value. Thus, it is determined that the user XYZ did not satisfy the guidance display condition at the time point of Jul. 15, 2012. That is, it is determined that the user XYZ was not suited to using the simple service.

The "guidance display condition" used above is merely an example and other "guidance display conditions" may be used. Because whether or not "guidance display conditions" are satisfied is determined in accordance with an operation history regarding multiple setting operations, various "guidance display conditions" are set. For example, a condition regarding whether or not a ratio of the number of times functions settable in the simple service are set to the number of times functions are set is greater than or equal to a predetermined value may be used as the "guidance display condition". In the example of the user ABC who used the normal copy on Jul. 15, 2012, the ratio of the number of times functions settable in the simple service are set to the number of times functions are set is "80%".

Modifications

The display control device, the service providing apparatus, and the program described in each of the above-described exemplary embodiments are merely examples and obviously the configurations thereof may be modified within the scope that does not depart from the gist of the present invention.

While the cases in which the guidance displaying screen is displayed after the user finishes a setting operation and in which the guidance displaying screen is displayed before the user starts a setting operation have been described in the first and second exemplary embodiments above, the guidance displaying screen may be displayed while the user is performing a setting operation. Referring to FIG. 10, the "guidance display process" performed during the "setting operation" will be described. Because the guidance displaying screen displayed during the setting operation is substantially the same as that illustrated in FIG. 14B, illustration thereof is omitted.

For example, after storing the setting period in step S322 of FIG. 10, the display controller 30 acquires an operation history (set functions, set values, and setting periods) of the user and determines whether or not the guidance display condition is satisfied based on the operation history. If the guidance display condition is satisfied, the display controller 30 displays a message "Simple copy offers you easier copying" or the like at the message display portion 602 of the normal setting screen 600 as illustrated in FIG. 14B, thereby displaying a guidance that recommends the user to use the simple service.

The "guidance display condition" used in the case where the guidance displaying screen is displayed during the setting operation may be the same as or different from the "guidance display condition" of the first and second exemplary embodiments. For example, a condition regarding whether or not the "setting period" stored in step S322 of FIG. 10 is longer than or equal to a predetermined period may be used as the "guidance display condition". Upon determining that the setting period is longer than or equal to the predetermined period during the setting operation performed on the normal setting screen, the display controller 30 displays the guidance displaying screen illustrated in FIG. 14B, thereby recommending the use of the simple service.

The example of displaying the guidance displaying screen that recommends the use of the simple service has been described in the first and second exemplary embodiments and modifications thereof above. However, the user possibly wishes to set a function that is not settable in the simple service while performing an operation on the simple setting screen. In such a case, a guidance displaying screen that recommends the use of the normal service may be displayed. For example, if an operation period of the operation performed on the simple setting screen is longer than or equal to a predetermined period (for example, 100 seconds), that is, if a service process is not started after the predetermined period passes, the display controller 30 displays a guidance displaying screen illustrated in FIG. 15.

Figure 15:
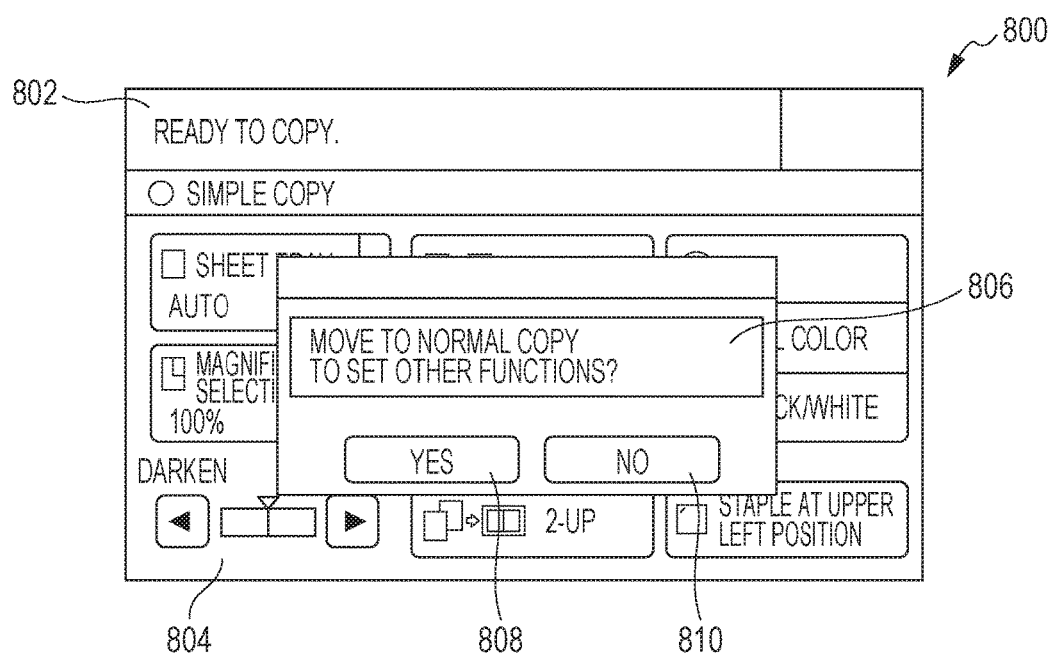
FIG. 15 is a schematic diagram illustrating an example of a guidance displaying screen that recommends the user to switch a copy mode from simple copy to normal copy.

FIG. 15 is a schematic diagram illustrating an example of a guidance displaying screen that recommends switching from the simple copy to the normal copy. As illustrated in FIG. 15, a simple setting screen 800 having a popup screen 806 may be displayed as the guidance displaying screen. The popup screen 806 is a window that is displayed so as to be superimposed on a selection target display portion 804 and is smaller than the selection target display portion 804. In this example, the popup screen 806 displays a message "Move to normal copy to set other functions?" or the like and selection buttons, thereby allowing one of the simple setting screen and the normal setting screen to be selected. In this example, if an agreement button 808 that displays "Yes" is pressed, the displayed screen changes to the normal setting screen. If a denial button 810 that displays "No" is pressed, the setting operation is continuously performed on the simple setting screen.

Also, the example of displaying the guidance displaying screen has been described in the first and second exemplary embodiments and the modifications thereof above. However, the setting of displaying the guidance displaying screen may be disabled. For example, in the example illustrated in FIG. 8, the user ABC started using the simple copy on Dec. 28, 2012 and the operation period "6 seconds" is shorter than those of the previous cases. In the case where an unaccustomed user has started using the simple service or in the case where the user becomes accustomed to perform a setting operation, the setting of displaying the guidance displaying screen to the user may be "disabled".

While the examples of displaying a guidance at the message display portion or on the popup screen has been described in the first and second exemplary embodiments and the like, the way of displaying the guidance is not limited to these examples. The guidance displaying screen may be displayed on the entire screen of the touch panel 60.

While the example in which an operation history, which contains information about the user, the operation date and time, the selected service, the set functions, the set values, and the setting periods, is stored as a table in the memory 46 of the operation-display section 14 has been described in the first and second exemplary embodiments and the like, the items contained in the operation history and the way of storing the operation history are not limited to this example. For example, information indicating whether or not the guidance is displayed may be contained in the operation history. Also, the operation history may be stored in an external storage device, such as a database.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control device comprising:
   a first memory configured to store data of a normal screen and data of a simple screen, the normal screen being a screen that displays functions related to a service process provided to a user, the simple screen being a screen that displays a smaller number of functions than the normal screen; and
   at least one processor configured to execute:
      an operation-display unit configured to display one of the normal screen and the simple screen to the user and to accept a setting operation performed by the user on a function among the displayed functions; and
      a display controller configured to control the operation-display unit to display an indication recommending that the user use the simple screen in response to determining that every function set by the user on the normal screen is settable on the simple screen,
   wherein the indication comprises a recommendation that the user use the simple screen, and
   wherein the display control device further comprises:
   a second memory configured to acquire an operation history containing information about a function set by the user, a set value of the function, and a setting period taken to set the function, and to store the acquired operation history in association with the user,
   wherein the display controller is further configured to determine whether or not to display the indication recommending that the user use the simple screen using the operation history.

2. The display control device according to claim 1, wherein the display controller is further configured to, if the user is using the display control device for a first time:
   determine whether to display the indication recommending that the user use the simple screen using the operation history of a first setting operation of the user, and
   control, in response to determining to display the indication recommending that the user use the simple screen, the operation-display unit so that the indication is displayed after the user finishes the first setting operation.

3. The display control device according to claim 1, wherein the display controller is further configured to, if the user has used the display control device before, then:
   determine whether to display the indication recommending that the user use the simple screen using the operation history regarding a plurality of setting operations, and
   control, in response to determining to display the indication recommending that the user use the simple screen the operation-display unit so that the indication is displayed before the user starts a setting operation.

4. The display control device according to claim 3, wherein the display controller is further configured to determine that the indication recommending that the user use the simple screen is to be displayed, if a ratio of functions settable on the simple screen to set functions that is calculated from the operation history regarding the plurality of setting operations is greater than or equal to a predetermined value.

5. The display control device according to claim 1, wherein the display controller is further configured to, if information about a function set by the user, a set value of the function, and a setting period taken to set the function is acquired during a setting operation, then:

determine whether to display the indication recommending that the user use the simple screen using the acquired information about the set function, set value, and setting period; and control, in response to determining to display the indication recommending that the user use the simple screen, the operation-display unit so that the indication is displayed during the setting operation.

6. A display control device comprising:

a first memory configured to store data of a normal screen and data of a simple screen, the normal screen being a screen that displays functions related to a service process provided to a user, the simple screen being a screen that displays a smaller number of functions than the normal screen; and at least one processor configured to execute:

an operation-display unit configured to display one of the normal screen and the simple screen to the user and to accept a setting operation performed by the user on a function among the displayed functions; and a display controller configured to control the operation-display unit to display an indication recommending that the user use the simple screen in response to determining that every function set by the user on the normal screen is settable on the simple screen, wherein the indication comprises a recommendation that the user use the simple screen, wherein the at least one processor is further configured to execute a measuring unit configured to measure a setting period taken by the user to set each function, wherein the display controller is further configured to control the operation-display unit so that the indication recommending that the user use the simple screen is displayed in response to determining that every function set by the user on the normal screen is settable on the simple screen and the setting period exceeds a certain value, wherein the display control device further comprises:

a second memory configured to acquire an operation history containing information about a function set by the user, a set value of the function, and a setting period taken to set the function, and to store the acquired operation history in association with the user, and wherein the display controller is further configured to determine whether or not to display the indication recommending that the user use the simple screen using the operation history.

7. The display control device according to claim 6, wherein the display controller is further configured to, if the user is using the display control device for a first time:

determine whether to display the indication recommending that the user use the simple screen using the operation history of a first setting operation of the user; and control, in response to determining to display the indication recommending that the user use the simple screen, the operation-display unit so that the indication is displayed after the user finishes the first setting operation.

8. The display control device according to claim 6, wherein the display controller is further configured to, if the user has used the display control device before, then:

determine whether to display the indication recommending that the user use the simple screen using the operation history regarding a plurality of setting operations, and control, in response to determining to display the indication recommending that the user use the simple screen, the operation-display unit so that the indication is displayed before the user starts a setting operation.

9. The display control device according to claim 8, wherein the display controller is further configured to determine that the indication recommending that the user use the simple screen is to be displayed, if a ratio of functions settable on the simple screen to set functions that is calculated from the operation history regarding the plurality of setting operations is greater than or equal to a predetermined value.

10. The display control device according to claim 6, wherein the display controller is further configured to, if information about a function set by the user, a set value of the function, and a setting period taken to set the function is acquired during a setting operation, then:

determine whether or not to display the indication recommending that the user use the simple screen using the acquired information about the set function, set value, and setting period; and control, in response to determining to display the indication recommending that the user use the simple screen, the operation-display unit so that the indication is displayed during the setting operation.

\* \* \* \* \*